United States Patent
Lee

(10) Patent No.: US 8,091,105 B2
(45) Date of Patent: Jan. 3, 2012

(54) METHOD AND APPARATUS FOR REPRODUCING CONTENTS BASED ON ELECTRONIC PROGRAM GUIDE

(75) Inventor: Kyung-eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 12/257,995

(22) Filed: Oct. 24, 2008

(65) Prior Publication Data

US 2009/0249402 A1    Oct. 1, 2009

(30) Foreign Application Priority Data

Mar. 27, 2008   (KR) .................. 10-2008-0028494

(51) Int. Cl.
  *G06F 13/00*   (2006.01)
  *G06F 3/00*   (2006.01)
  *H04N 5/445*   (2006.01)

(52) U.S. Cl. .............. 725/46; 725/48; 725/49; 725/51

(58) Field of Classification Search .............. 725/48, 725/49, 51, 46
See application file for complete search history.

(56) References Cited

U.S. PATENT DOCUMENTS

| | | | |
|---|---|---|---|
| 6,177,931 B1 * | 1/2001 | Alexander et al. ............... | 725/52 |
| 6,754,904 B1 * | 6/2004 | Cooper et al. .................. | 725/32 |
| 7,404,200 B1 * | 7/2008 | Hailey et al. ..................... | 725/39 |
| 7,571,452 B2 * | 8/2009 | Gutta ............................. | 725/46 |
| 7,594,245 B2 * | 9/2009 | Sezan et al. .................... | 725/46 |

* cited by examiner

*Primary Examiner* — Hunter Lonsberry
(74) *Attorney, Agent, or Firm* — Sughrue Mion, PLLC

(57) ABSTRACT

Provided are a method of and an apparatus for reproducing contents based on an Electronic Program Guide (EPG), the method including receiving a plurality of EPGs which are provided by a plurality of content providers, receiving a first EPG generated by a third party using the plurality of EPGs, generating a second EPG using at least one of a list of contents stored in an external storage device, a list of contents retrieved through the Internet, the plurality of EPGs, and the first EPG, and generating the contents based on the second EPG.

26 Claims, 5 Drawing Sheets

FIG. 1

|  | 18:00 | 19:00 | 20:00 | 21:00 | 22:00 | 23:00 |
|---|---|---|---|---|---|---|
| CH 1 | DRAMA 1 | | NEWS 1 | DOCUMENTARY 1 | | |
| CH 2 | | DRAMA 2 | | SPORTS 1 | | MOVIE 1 |
| CH 3 | MOVIE 2 | | NEWS 3 | | SPORTS 2 | |
| CH 4 | NEWS 4 | | DOCUMENTARY 2 | | | MOVIE 3 |

METHOD AND APPARATUS FOR REPRODUCING CONTENTS BASED ON ELECTRONIC PROGRAM GUIDE

CROSS-REFERENCE TO RELATED PATENT APPLICATION

This application claims priority from Korean Patent Application No. 10-2008-0028494 filed on Mar. 27, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to reproducing contents based on an Electronic Program Guide (EPG).

2. Description of the Related Art

As Internet ready digital TVs become widely distributed, users can enjoy a larger amount of content through various broadcasting channels. In order for the users to identify so many broadcasting channels, each broadcasting channel has begun to provide an Electronic Program Guide (EPG) for the content that it broadcasts.

An EPG may include: a title of each item of content being provided by each broadcast channel, the start and end times of each item of content, description of the item of content and a synopsis of the item of content, or the like.

FIG. 1 is a diagram illustrating an EPG in the related art.

Referring to FIG. 1, a plurality of types of content of broadcasting channels CH. 1 to CH. 4 and the schedules of their airing times are shown. The user checks the schedule of such an EPG to view a desired item of content.

For example, in the case where the user wants to watch News 1, the user can choose CH. 1 at 19:00-20:00. Similarly, if the user wants to watch Sports 2, the user can choose CH. 3 at 21:00-23:00.

However, in the related art, the user is required to view the contents according to an EPG provided by a content provider, and therefore the user has to select a set channel at a set time in order to view desired contents, which is inconvenient. Moreover, in the case where the content that the user wants to view is not present, the user can view the contents stored on an external storage device or through the Internet on the TV. In the related art, however, the user searches for and selects the contents from the external storage device or the like, and then the input source of the TV had to be switched so that the selected content can be reproduced through the TV, which is inconvenient.

SUMMARY OF THE INVENTION

The present invention provides a method and an apparatus for reproducing contents which allows users to view desired contents without switching channels, and to view the desired contents with a third party at the same time.

According to an aspect of the present invention, there is provided a method of reproducing contents based on an Electronic Program Guide (EPG), the method including: receiving a plurality of EPGs provided by each of a plurality of content providers, receiving a first EPG generated from the plurality of EPGs, generating a second EPG by using the plurality of EPGs and the first EPG, and reproducing the contents based on the second EPG generated above.

The method may further include requesting a communication connection to the third party if there is a corresponding schedule between the first EPG and the second EPG, a content corresponding to the same schedule is reproduced; and outputting a user interface for communication between the user and the third party, once a response authorizing the communication connection is received from the third party.

The user interface for the communication may be an interface for performing at least one activity of text chatting, video chatting, voice calling, and video calling.

The receiving of the first EPG may further include receiving a meta data of the first EPG, and requesting the communication connection to be carried out based on at least one of the Internet Protocol (IP) addresses corresponding to an identifier of the third party and to the third party included in the meta data of the first EPG.

The generating of the second EPG may be carried out by using at least one selection from a group consisting of: a list of contents stored in an external storage device, a list of contents retrieved through the Internet, the plurality of EPGs, and the first EPG.

The generating of the second EPG is carried out based on a user input, and the user input may be performed through an input device including at least one of a remote control, a keyboard, a mouse, and a touch screen.

Generating the second EPG may be carried out by moving the schedules of the plurality of EPGs and the first EPG to the second EPG in a drag-and-drop manner.

The second EPG may be for a virtual channel provided by a device reproducing the content, and the content is reproduced from the virtual channel.

The plurality of content providers may include at least one of a broadcasting station and a content server.

According to another aspect of the present invention, there is provided an apparatus for reproducing contents based on an EPG, wherein the apparatus including a receiving unit which receives a plurality of EPGs provided by each of a plurality of content providers, and receives a first EPG generated by a third party by using the plurality of EPGs; an EPG generating unit generating a second EPG by using the plurality of EPGs and the first EPG; and a reproducing unit reproducing the contents based on the generated second EPG.

The content reproducing apparatus may further include a connection requesting unit which requests a communication connection to the third party if there is a same schedule between the first EPG and the second EPG, a content corresponding to the same schedule is reproduced; an interface generating unit which generates a user interface for communication between the user and the third party if a response authorizing the communication connection is received from the third party through the receiving unit; and an output unit which outputs the generated user interface.

According to another aspect of the present invention, there is provided a computer readable medium having a program recorded thereon, the computer program if executed by a computer causes the computer to execute the method of reproducing contents based on the EPG including: receiving a plurality of EPGs provided by each of a plurality of content providers; receiving a first EPG generated by a third party using the plurality of EPGs; generating a second EPG using the plurality of EPGs and the first EPG; and generating a content based on the second EPG is recorded.

BRIEF DESCRIPTION OF THE DRAWINGS

The above and other aspects of the present invention will become more apparent by describing in detail exemplary embodiments thereof with reference to the attached drawings in which:

FIG. 1 is a diagram illustrating an Electronic Program Guide (EPG) in the related art;

DETAILED DESCRIPTION OF THE EXEMPLARY EMBODIMENTS OF THE INVENTION

The exemplary embodiments of the present invention will be described more fully with reference to the accompanying drawings.

Figure 2:
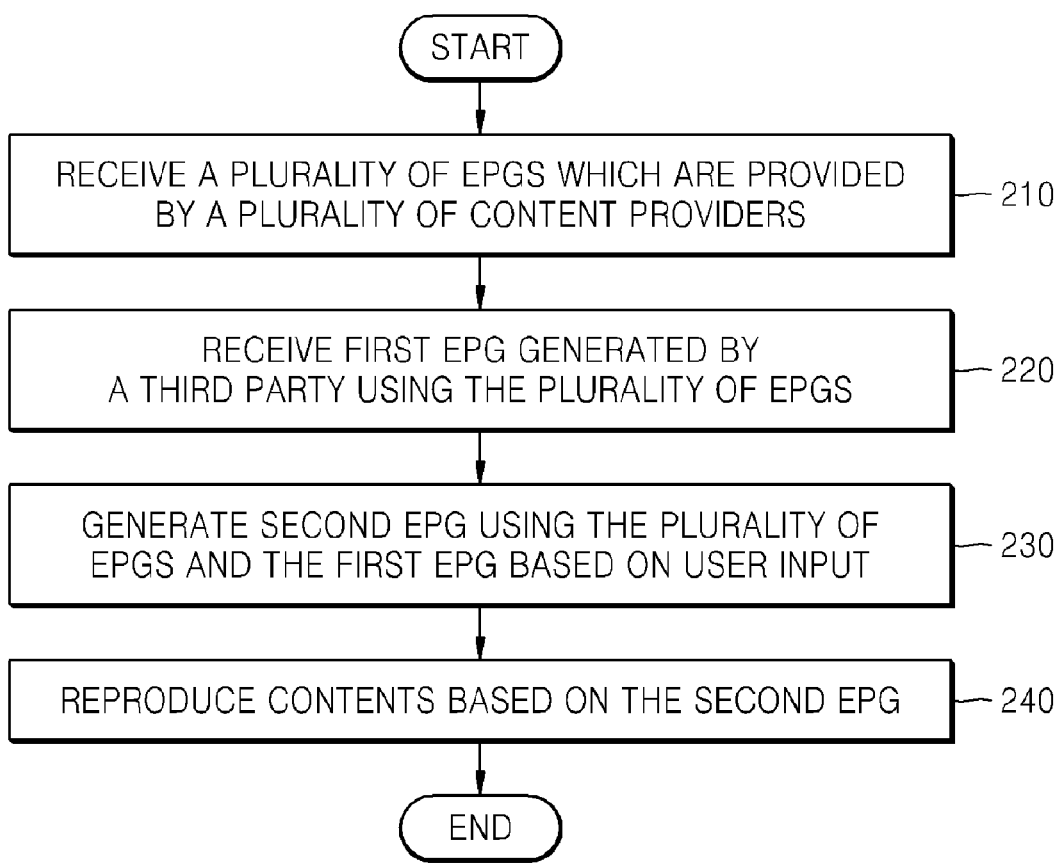
FIG. 2 is a flowchart illustrating a method of reproducing contents according to an exemplary embodiment of the present invention.

FIG. 2 is a flowchart illustrating a method of reproducing contents according to an exemplary embodiment of the present invention.

In operation 210, a plurality of EPGs, which are EPGs provided by each of a plurality of content providers, is received.

The plurality of content providers may include a broadcasting station, a content server, or the like. For example, in the current exemplary embodiment of FIG. 1, CH. 1 may be a broadcasting station channel for a terrestrial wave TV, and CH. 2 may be a contents server channel for Internet Protocol (IP) TV.

The contents provided by the plurality of content providers include a broadcast program, video data and the like.

In operation 220, a first EPG generated by a third party using the plurality of EPGs are received.

The first EPG is an EPG made up of contents desired to be viewed by the third party, and may be plural in number. For example, a user may receive a first EPG generated by friend A and a first EPG generated by friend B.

In operation 230, a second EPG is generated using the plurality of EPGs and the first EPG based on the input of the user.

Since the present invention generates the second EPG with reference to the first EPG, which content is viewed by the third party and at which time may be known, thereby allowing the user to view the same contents at the same time with the third party. In particular, in the case where the preference of the third party is the same as that of the user, the user can easily generate an EPG including contents desired to be viewed by referring to the EPG of the third party.

Figure 3:
FIG. 3 is a diagram illustrating a method of generating an EPG according to an exemplary embodiment of the present invention.

FIG. 3 is a diagram illustrating a method of generating an EPG according to an exemplary embodiment of the present invention.

Referring to FIG. 3, a plurality of EPGs 312, 314, 316, and 318, which are provided by a plurality of content providers, a first EPG 320 received from a third party, and a second EPG 330 generated from the plurality of EPGs 312, 314, 316, and 318 and the first EPG 320 are shown.

The first EPG 320 may be generated by a friend of the user from the schedules of the contents desired to be viewed from the plurality of EPGs 312, 314, 316, and 318.

For example, the third party of FIG. 3 receives the plurality of EPGs 312, 314, 316, and 318, and then extracts a schedule of Drama 1 from EPG 312 of CH. 1, News 3 from EPG 316 of CH. 3, and Movie 3 from EPG 318 of CH. 4, from among the plurality of EPGs, to generate the first EPG 320.

The user may generate the second EPG 330 by extracting the schedules of the contents the user desires to view from the plurality of EPGs 312, 314, 316, and 318, and the first EPG 320. Here, the user may also generate the second EPG 330 using, besides the plurality of EPGs 312, 314, 316, and 318, and the first EPG 320, a list of contents stored in an external storage device, and a list of contents retrieved through the Internet.

For example, the user in FIG. 3 may extract a schedule of Drama 1 from the first EPG 320 and add a schedule of Movie 1 from EPG 314 of CH. 2 from among the plurality of EPGs 312, 314, 316, and 318 and add the extracted schedules of Drama I and Movie 1 to the second EPG 330, and add a schedule of Video 1 using a list of contents stored in an external storage device such as a PC to the second EPG 330. Further, the list of contents may be accessed through an application such as Windows Explorer of a computer.

Meanwhile, according to an exemplary embodiment of the present invention, the second EPG 330 may be organized at different times from the schedules of the plurality of EPG 310 and the first EPG 320. For example, Drama 2 of CH. 2 is originally broadcasted from 18:00 to 19:30, but it may be arranged such that Drama 2 is broadcasted in the second EPG 330 from 21:00 to 22:30. In this case, Drama 2 received from CH. 2 at 18:00-19:30 may be recorded, and reproduced at 21:00-22:30. (Not shown in FIG. 3).

When the second EPG 330 is generated as such, the user may use a remote control, a keyboard, a mouse or the like to enter the input for generating the second EPG 330. Meanwhile, according to an exemplary embodiment, the content reproducing apparatus may include a touch screen, wherein the user may enter an input in order to generate the second EPG 330. For example, the user may select the schedules of contents the user wishes to view from the plurality of EPGs 312, 314, 316, and 318 and the first EPG 320 through the touch screen, and may move the schedules in a drag-and-drop manner on the second EPG 330 to generate the second EPG 330.

Meanwhile, the format of the second EPG 330 is not limited to the format shown in FIG. 3, but may be organized using all types of formats that can display broadcasting schedules of the contents.

In operation 240, contents are reproduced based on the second EPG.

The contents may be reproduced via a virtual channel of the content reproducing apparatus. That is, the contents may be reproduced according to the schedule of the second EPG in a single virtual channel. Thereby, the user is able to view the contents reproduced according to the schedule of the second EPG set by the user through the virtual channel.

In the example of FIG. 3, the contents will be reproduced in the order of Drama 1, Video 1, and Movie 1 according to the second EPG 330. Drama 1 may be received in real time from CH. 1 which is a terrestrial wave broadcasting channel and reproduced, Video 1 may be received from an external storage device and reproduced, and Movie 1 may be received from CH. 2 which is a channel for IP TV and reproduced.

Moreover, according to an exemplary embodiment, in a case where power is not applied to the content reproducing apparatus, the contents may be reproduced after the power is applied to the content reproducing apparatus according to the schedule of the second EPG.

Figure 4:
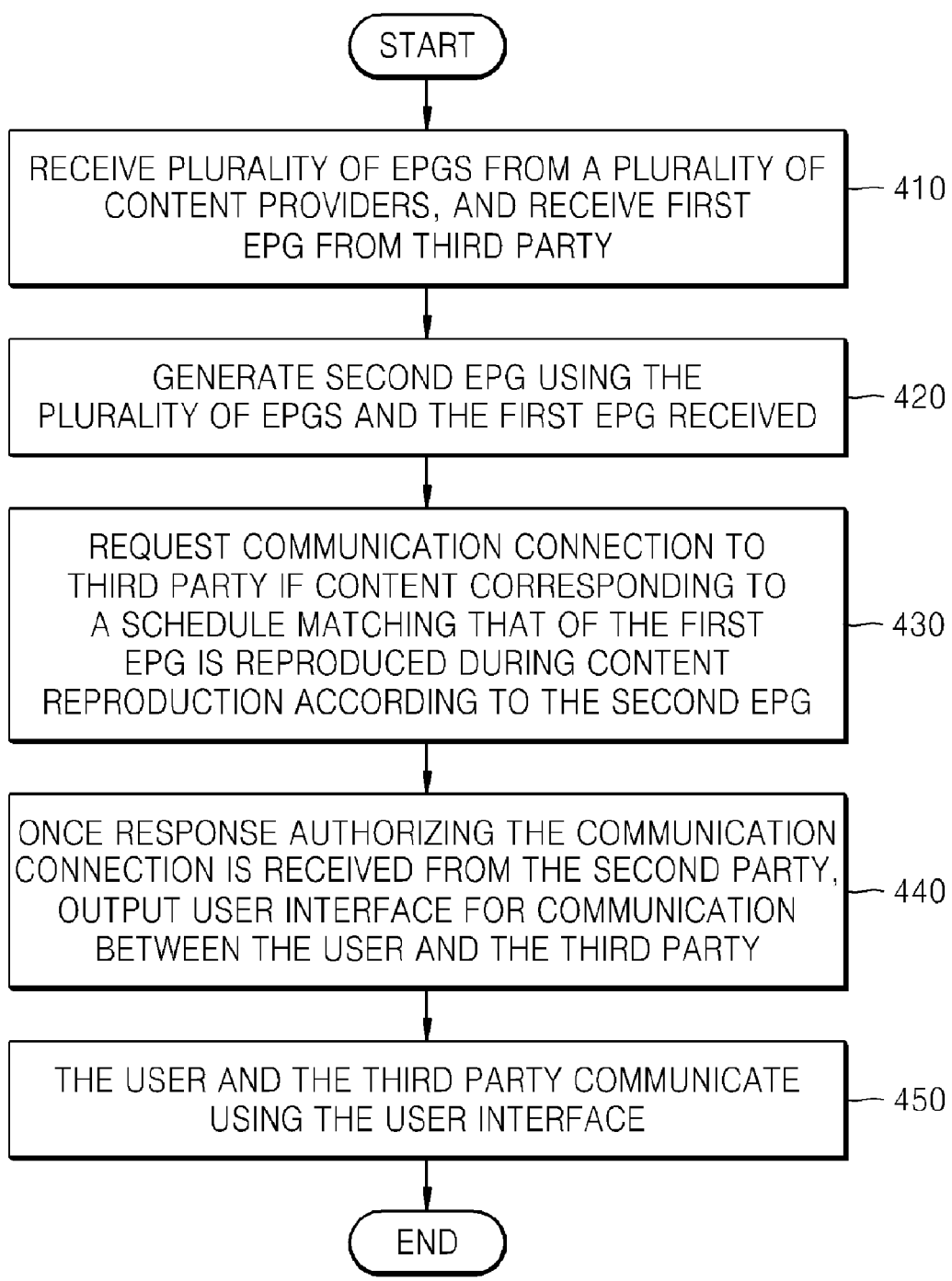
FIG. 4 is a diagram illustrating an exemplary application of the method of reproducing contents according to the present invention.

FIG. 4 is a diagram illustrating an exemplary application of the method of reproducing the contents according to the present invention.

In operation 410, a plurality of EPGs are received from a plurality of content providers, and a first EPG is received from the third party.

In operation 420 a second EPG is generated by the user using the received plurality of EPGs and a first EPG.

The second EPG may be transmitted to other people, and a person who receives the second EPG may generate a new EPG by using the second EPG.

In operation 430, a request for a communication connection with a third party is made during content reproduction of the second EPG if a content corresponding to a schedule matching that of the first EPG is reproduced.

For example, referring to FIG. 3, the user and the third party may view Drama 1 at the same time. If Drama 1 is reproduced from the content reproducing apparatus of the user, a communication connection to the third person may be automatically requested. Depending on the embodiments of the present invention, however, the communication connection is not automatically requested and a predetermined button of an input device may be clicked so as to request the communication connection to the third party.

The communication connection may be requested by using an identifier of the third party and the Internet Protocol (IP) address corresponding to the identifier of the third party that transferred the first EPG. Such information may be obtained from meta data of the first EPG, and the meta data of the first EPG may be received simultaneously when the first EPG is received.

In operation 440, once a response authorizing the communication connection is received from the third party, a user interface is output for communication between the user and the third party.

The user interface may be an interface for performing at least one activity of text chatting, video chatting, voice calling, and video calling.

In operation 450, the user and the third party may communicate with each other using the outputted user interface.

It is possible for the user to view the same contents as the third party, while text chatting, video chatting, voice calling, and video calling.

Figure 5:
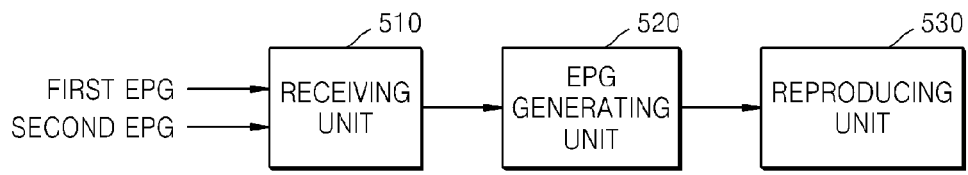
FIG. 5 is a block diagram of a content reproducing apparatus according to an exemplary embodiment of the present invention.

FIG. 5 is a block diagram of a content reproducing apparatus according to an exemplary embodiment of the present invention.

Referring to FIG. 5, the content reproducing apparatus according to the present invention includes a receiving unit 510, an EPG generating unit 520, and a reproducing unit 530.

The receiving unit 510 receives the plurality of EPGs, which are provided by the plurality of content providers, and a first EPG which is generated by the third party by using the plurality of EPGs.

The EPG generating unit 520 generates a second EPG by using the plurality of EPGs and the first EPG, based on the input of the user.

The reproducing unit 530 reproduces contents based on the second EPG generated by the EPG generating unit 520.

The content reproducing apparatus according to an exemplary embodiment of the present invention includes a virtual channel, and the contents are reproduced via the virtual channel.

Figure 6:
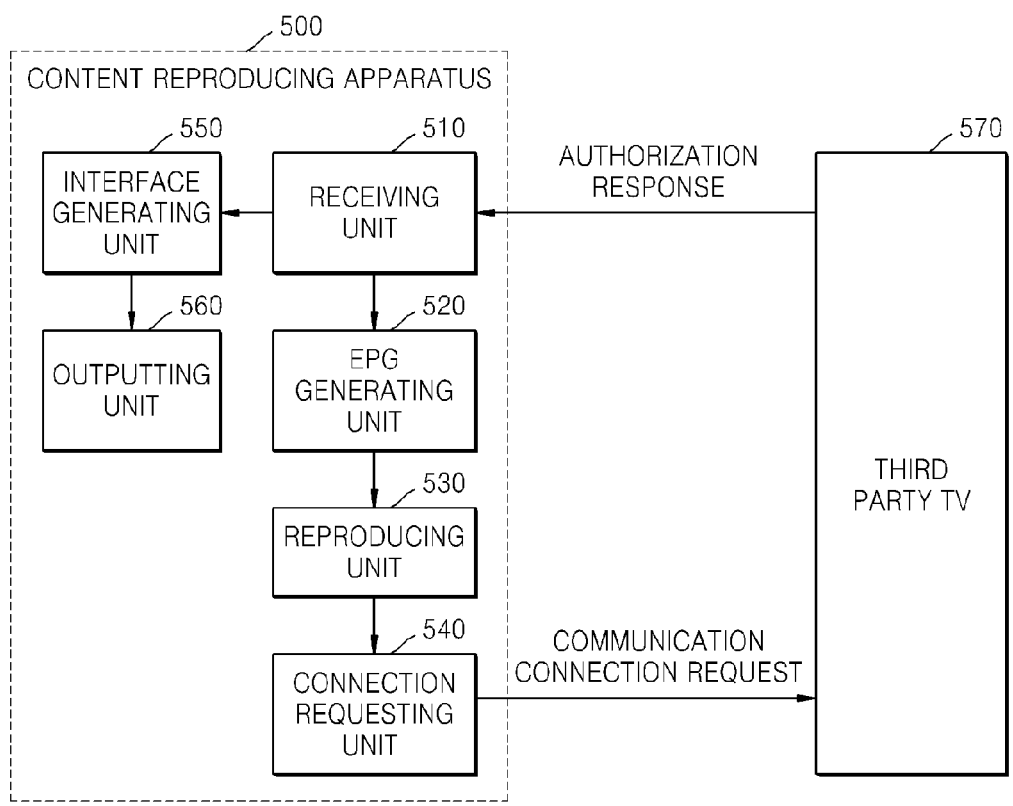
FIG. 6 is a block diagram of a content reproducing apparatus according to another exemplary embodiment of the present invention.

FIG. 6 is a block diagram of a content reproducing apparatus 500 according to an exemplary embodiment of the present invention.

Referring to FIG. 6, the content reproducing apparatus 500 according to the present invention includes a receiving unit 510, an EPG generating unit 520, a reproducing unit 530, a connection requesting unit 540, an interface generating unit 550, and an outputting unit 560. A TV 570 of a third party is further shown for convenience of explanation. Moreover, because the receiving unit 530, the EPG generating unit 520, and the reproducing unit 530 perform the same activities as in FIG. 5, a repeated description thereof will be omitted here.

The connection requesting unit 540 requests a communication connection with the third party TV 570 if there is a matching schedule between the second EPG and the first EPG, content corresponding to the matching schedule is reproduced. More particularly, the connection requesting unit 540 receives the information on the content currently being reproduced from the reproducing unit 530, and requests communication connection with the third party TV 570 that transmitted the first EPG, if the content corresponding to the schedule matching that of the first EPG is being reproduced.

The interface generating unit 550 generates the user interface for communication between the user and the third party, once a response authorizing the communication connection from the third party TV 570 is received through the receiving unit 510.

The outputting unit 560 outputs the user interface generated by the interface generating unit 550.

Meanwhile, the exemplary embodiments of the present invention previously described may be prepared as a program that can be executed in computers, and may be implemented in universal digital computers which runs the program that is recorded on a computer readable recording medium.

Examples of computer readable recording media include magnetic storage media (such as ROM, floppy disk, hard disks, etc.), and optical recording media (such as CD-ROM, DVD, etc.).

The invention can also be embodied as computer readable codes on a computer readable transmission medium. Examples of the computer readable transmission medium include carrier waves (such as data transmission through the Internet).

The present invention enables users to view contents desired by users without switching channels, and allows the contents to be viewed by a third party at the same time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of reproducing contents based on an Electronic Program Guide (EPG), the method comprising:
    receiving a plurality of EPGs which are provided by a plurality of content providers;
    receiving a first EPG which is generated by a third party by using the plurality of EPGs;
    generating a second EPG by using the received plurality of EPGs and the received first EPG; and
    reproducing contents based on the second EPG.

2. The method of claim 1, wherein each of the plurality of EPGs comprises:
    a title of each item of a content being provided by each broadcast channel;
    a start and end time of the each item of the content;
    a description of the each item of the content; and
    a synopsis of the each item of the content.

3. The method of claim 1, further comprising:
  requesting a communication connection with the third party if a corresponding schedule of a content between the first EPG and the second EPG is reproduced; and
  outputting a user interface for communication between a user and the third party if a response authorizing the communication connection is received from the third party.

4. The method of claim 3, wherein the user interface for communication performs at least one of text chatting, video chatting, voice calling, and video calling.

5. The method of claim 3, wherein the receiving of the first EPG further comprises receiving meta data of the first EPG, wherein
  the meta data comprises an identifier of the third party and an Internet Protocol (IP) address which corresponds to the third party, and
  the requesting of the communication connection is carried out based on at least one of the identifier of the third party and the IP address.

6. The method of claim 1, wherein the second EPG comprises at least one of a list of contents stored in an external storage device, a list of contents retrieved through the Internet, the plurality of EPGs, and the first EPG.

7. The method of claim 1, wherein the generating of the second EPG is carried out based on a user input performed through an input device comprising at least one of a remote control, a keyboard, a mouse, and a touch screen.

8. The method of claim 1, wherein the generating the second EPG comprises moving selected schedules of the content of the plurality of EPGs and the first EPG to the second EPG in a drag-and-drop manner.

9. The method of claim 8,
  wherein the drag-and-drop manner comprises moving the selected schedules to any available time slot in the second EPG.

10. The method of claim 1, wherein the reproducing the contents based on the second EPG comprises reproducing the content via a virtual channel provided by a content reproducing device.

11. The method of claim 1, wherein the plurality of content providers comprises at least one of a broadcasting station and a content server.

12. The method of claim 1, wherein the contents comprise at least one of a broadcast program and video data.

13. A computer readable recording medium having a program recorded thereon, the computer program if executed by a computer causes the computer to execute the method of claim 1.

14. The method of claim 1, wherein the first EPG is generated by the third party by receiving the plurality of EPGs and extracting at least one EPG from the plurality of EPGs, and the second EPG is generated by extracting at least one EPG from the received plurality of EPGs and extracting at least one EPG from the received first EPG.

15. An apparatus reproducing contents based on an Electronic Program Guide (EPG), the apparatus comprising:
  a receiving unit which receives a plurality of EPGs provided by a plurality of content providers, and receives a first EPG which is generated by a third party by using the plurality of EPGs;
  an EPG generating unit which generates a second EPG by using the received plurality of EPGs and the received first EPG; and
  a content reproducing unit which reproduces the contents based on the second EPG.

16. The apparatus of claim 12, wherein each of the plurality of EPGs comprises:
  a title of each item of a content being provided by each broadcast channel;
  a start and end time of the each item of the content;
  a description of the each item of the content; and
  a synopsis of the each item of the content.

17. The apparatus of claim 15, further comprising:
  a connection requesting unit which requests a communication connection with the third party if a corresponding schedule of a content between the first EPG and the second EPG is reproduced;
  an interface generating unit which generates a user interface for communication between a user and the third party if a response authorizing the communication connection is received from the third party through the receiving unit; and
  an output unit which outputs the user interface.

18. The apparatus of claim 17, wherein the user interface for the communication performs at least one of text chatting, video chatting, voice calling, and video calling.

19. The apparatus of claim 17, wherein the receiving unit further receives a meta data of the first EPG, wherein
  the meta data comprises an identifier of the third party and an Internet Protocol (IP) address which corresponds to the third party, and
  the connection requesting unit performs the request based on at least one of the identifier of the third party and the IP address.

20. The apparatus of claim 15, wherein the EPG generating unit generates the second EPG using at least one of a list of contents stored in an external storage device, a list of contents retrieved through the Internet, the plurality of EPGs, and the first EPG.

21. The apparatus of claim 15, further comprising an input device which receives a user input, wherein the second EPG is generated based on the user input,
  and wherein the input device comprises at least one of a remote control, a keyboard, a mouse, and a touch screen.

22. The apparatus of claim 15, wherein the EPG generating unit generates the second EPG by moving selected schedules of the plurality of EPGs and the first EPG to the second EPG in a drag-and-drop manner.

23. The apparatus of claim 22, wherein the drag-and-drop manner comprises moving the selected schedules to any available time slot in the second EPG.

24. The apparatus of claim 15, wherein the content reproducing unit comprises a virtual channel,
  wherein the content of the second EPG is reproduced via the virtual channel.

25. The apparatus of claim 15, wherein the plurality of content providers comprises at least one of a broadcasting station and the contents server.

26. The apparatus of claim 15, wherein the first EPG is generated by the third party by receiving the plurality of EPGs and extracting at least one EPG from the plurality of EPGs, and the second EPG is generated by extracting at least one EPG from the received plurality of EPGs and extracting at least one EPG from the received first EPG.

* * * * *